Patented Feb. 24, 1942

2,273,859

UNITED STATES PATENT OFFICE 2,273,859

MAKING CERAMIC ARTICLES

Robert E. Gould, Eden, N. Y.

No Drawing. Application October 31, 1938,
Serial No. 238,092

5 Claims. (Cl. 25—156)

(Granted under the act of March 3, 1883, as
amended April 30, 1928; 370 O. G. 757)

The invention herein described may be manufactured and used by or for the Government for governmental purposes without the payment to me of any royalty thereon.

This invention relates to a process of molding ceramic articles, particularly in the manufacture of flat, oval or round dinnerware which is molded from plastic raw ceramic material.

One of the objects of this invention is to provide a process for molding ceramic articles from clay of low plasticity. Another object of this invention is to provide a process for forming the obverse and reverse of molded ceramic articles simultaneously. Still another object of this invention is to provide a process for the formation of molded ceramic articles which may be dried and fired without removing the molded article from the mold. Other objects of this invention include the provision of a process for relieving the strains in molded ceramic ware by forming the top and bottom of the ware simultaneously.

In the manufacture of ceramic dinnerware the usual procedure consists in forming a round sheet of proper thickness from a plastic clay, impressing this sheet, either by hand or by throwing onto a plaster of Paris mold having a profile which is complementary to one side of the finished ceramic article, placing the plaster mold covered with the clay into a machine which revolves on a vertical axis and forming the other side by cutting the revolving piece of clay with a metal tool which has a profile complementary to exactly one-half the desired shape for the opposite side of the piece as formed by the face of the plaster mold.

As practically all dinnerware has a rim which is higher than the center, or well of the article, a flat sheet of plastic clay, or "bat" as it is called in the ceramic trade, must be distorted to conform with this shape. It is well known that the handling of the "bat," the unevenness of the distortion and the resulting strains which are set up are some of the primary causes of the finished ware being warped. The tendency towards distortion is aggravated with the increase in vitrification of the article, that is to say, after the molded article is fired, or burned, to the point where it is impervious to water and assumes a glass-like texture, the strains existing in the molded article will have a greater tendency to distort the shape of the finished ware than when the molded article is burned only to a semi-vitreous state.

I have discovered a process for substantially eliminating the lack of uniformity of molded ceramic articles, caused either by entrapping air within the plastic clay from which the article is molded or by forming the top and bottom of the molded article in two separate operations, by simultaneously forming one side of the ceramic article from plastic clay on a thin flexible fluid pervious surface forming membrane capable of conforming itself to the contours of a supporting surface and of transmitting a fluid pressure differential uniformly to the surface of the plastic clay as the ceramic article is formed, by forming the other side of the ceramic article by pressing and shearing the clay and by applying a subatmospheric pressure to the bottom of the fluid pervious surface forming membrane during the forming of the article to maintain a substantially uniform fluid pressure differential through the plastic clay as the article is formed.

One example of the operation of my process is given for the production of ceramic dinnerware using apparatus for making ceramic articles described and claimed in my application Serial No. 67,936 filed March 9, 1936, now United States Patent No. 2,080,418 issued May 18, 1937. A hollow metal cylinder was prepared with one end shaped complementary to the reverse side of the ware to be formed, with allowance being made for the thickness of a gas pervious diaphragm of chamois skin to be subsequently placed over it. This end of the cylinder was drilled uniformly with one $\frac{1}{32}$" diameter hole per square inch of surface and in addition the same size holes were drilled on $\frac{3}{8}$" centers through the part of the mold to be occupied by the foot of the dinnerware. A hollow shaft was centered outside the other end of the cylinder and the completed cylinder was fitted into a standard jigger so that it could revolve around a predetermined vertical axis and the vacuum could be applied while the cylinder was in motion. The flexible gas pervious diaphragm of chamois skin was then placed over the end of the cylinder which served as a mold, held in place with a ring around and near the top of the cylinder, and then a vacuum of approximately 10" of mercury was applied. A porcelain body clay of low plasticity containing approximately 35% water was made using a mixture of 50% by weight of coarse grained North Carolina primary kaolin, 25% by weight of quartz finer than 200 mesh and 25% by weight of feldspar finer than 200 mesh. A piece of this plastic clay was placed in approximately the center of the mold and the jigger set in motion. A tool with a profile complementary to exactly one-half of the profile of the vertical section of the article opposite the mold was brought down upon the clay and by the action of the revolving and lowering of the tool the clay was spun in the usual manner to form the molded article. As the operation of forming the article with the tool proceeded the vacuum applied to the lower side of the diaphragm was increased until a pressure of approximately 15″ of mercury was obtained at the time of completion of the forming operation. A plaster mold corresponding exactly to the jiggered obverse of the molded article was inverted and fitted on the obverse of the molded article and the vacuum released. The plaster mold, the molded article and the gas pervious diaphragm were removed from the metal cylinder after applying a pressure of 1 to 2 pounds per square inch within the cylinder. The diaphragm was removed from the reverse of the molded article after a gentle spraying with water. The molded article on the plaster mold was dried for 3 hours at 176° F. (80° C.). The dried molded article was then fired for 6 hours at 1652° F. (900° C.) in an electric kiln to the bisque state and then porcelain glazed and fired for 8 hours at 2588° F. (1420° C.), in a deducing atmosphere.

It is evident that there are numerous factors which will influence conditions for the most satisfactory operation of my invention, the actual limits of which cannot be established except by a detailed study of each set of raw materials and of the intermediate and finished products involved.

The thin flexible fluid pervious surface forming membrane or gas pervious diaphragm used must be of such material as to be capable of conforming itself to the contours of a supporting surface of any reasonable preconceived shape, such as the design of the bottom or top of a piece of dinnerware, or such membrane or diaphragm may be preformed to the shape required. The membrane or diaphragm must be sufficiently gas pervious to permit gas to pass through it when either a moderate superatmospheric or a moderate subatmospheric pressure is applied thereto when in position on a supporting surface. The character of the membrane or diaphragm and its location, as well as the character and location of the fluid pervious supporting surface, shall be such that the membrane or diaphragm is capable of transmitting a fluid pressure differential uniformly to the surface of the plastic clay as the ceramic article is formed. Materials such as chamois skin, textile fabrics and cellulose compositions have been found to be suitable for this purpose. Under conditions which require the use of less skilled labor or the use of materials of low plasticity, molded diaphragms made of cellulose products conforming to the requirements of gas perviousness may be used. Under the latter circumstances, the molded article may be removed along with the diaphragm, the combination dried, and on firing the diaphragm burned and the molded article vitrified to the desired extent.

The membrane or diaphragm support may be so constructed that its use may be adapted to any standard type jigger. The support is preferably cylindrical or conical but its shape is immaterial as long as the following requirements are met: the top of the support is shaped to be complementary to the shape of one side of the molded article with allowances being made for the thickness or style of diaphragm used; the top of the support must be provided with uniform perforations produced by any convenient means with the perforations joined to a common outlet so that the subatmospheric pressure may be applied to the bottom of the diaphragm during the rotation of the support in the jigger while the molded article is being formed by the use of an appropriate tool. This support may be made by machining a suitable piece of material or by machining a casting especially designed for the purpose. The perforated diaphragm support proper may be removable in order that various designs of ceramic ware may be molded in any unit with a minimum change.

In the operation of my invention the gas pervious diaphragm is placed on the diaphragm support, held in place by a ring around and near the top of the support body and the vacuum applied so that the diaphragm adheres to the support and will make an accurate mold for one side of the ceramic article which is being produced. As the article is being formed by the action of the tool on the rotating mass of plastic clay, an increasing area of the diaphragm is covered until the diaphragm is completely covered. As the area of the diaphragm covered is increased the vacuum applied to the diaphragm can be increased since the plastic clay is less pervious to gas than the diaphragm used.

Under some circumstances it is sufficient only to provide a gas pervious diaphragm since this will permit entrapped air held between the plastic clay and the diaphragm to pass by virtue of the slightly superatmospheric pressure produced during the shaping of the ceramic article with the tool. It is ordinarily more preferable, however, to start the operation with the proper shaping of the diaphragm using a vacuum in the order of 5″ mercury. As the forming of the article proceeds this pressure may be increased materially. Under the conditions investigated a final pressure up to 20″ mercury has been found suitable for the production of molded articles which have the proper characteristics when burned. The pressure will vary depending upon the gas perviousness of the diaphragm, properties of the plastic clay used, the time required for forming and the time used for the application of the reduced pressure after the article has been formed. In any event it is necessary to have a uniform pressure differential from the top of the plastic clay to the bottom of the gas pervious diaphragm mold while the ceramic article is being molded. Ordinarily a plaster mold or cast which is exactly complementary to the side of the article formed with the tool is fitted on to the side so formed, the ring holding the gas pervious diaphragm removed, the vacuum in the diaphragm support body released and a slight positive pressure applied. This causes the diaphragm to be released from the diaphragm support proper so that the plaster mold, the molded article and the diaphragm may be removed from the jigger assembly. Where the gas pervious diaphragm is chamois skin a moderate spraying with water permits it to be removed readily. The molded article is then dried on the plaster mold after which it is removed from the mold, fired, glazed and refired.

The plastic clay, which is molded, may consist of one or a plurality of mineral ingredients or chemical compounds suitable for this purpose.

In forming oval ware, the head, which carries the gas pervious diaphragm and support, moves eccentrically, as is customary in forming this specific class of ware from plastic material.

It will be seen, therefore, that this invention actually may be carried out by the use of various modifications and changes without departing from its spirit and scope, with only such limitations placed thereon as are imposed by the prior art.

This application is a continuation-in-part of my application Serial No. 67,937, filed March 9, 1936. One form of apparatus suitable for the embodiment of the present process is illustrated and described in my application Serial No. 67,936, filed March 9, 1936, now U. S. Patent No. 2,080,418, issued May 18, 1937.

I claim:

1. Process of making a ceramic article from plastic clay, which comprises simultaneously forming one side of a ceramic article from plastic clay on a thin fluid pervious mold of uniform thickness and forming the other side of the plastic article by pressing and shearing the plastic clay; applying a subatmospheric pressure to the bottom of the fluid pervious mold during the forming of the article to maintain a uniform differential pressure between the top and bottom of the plastic clay as the article is molded; placing the face of a cast, preformed to be complementary to the top of the molded article, on the molded article; separating the cast and the molded article from the mold; drying the molded article; separating the dried, molded article from the cast; and firing the dried molded article to produce a semi-vitrified ceramic article.

2. Process of making a dried molded ceramic article from plastic clay, which comprises simultaneously forming one side of a ceramic article from plastic clay on a thin fluid pervious mold of uniform thickness and forming the other side of the plastic article by pressing and shearing the plastic clay; applying a subatmospheric pressure to the bottom of the fluid pervious mold during the forming of the article to maintain a uniform differential pressure between the top and bottom of the plastic clay as the article is molded; placing the face of a cast, preformed to be complementary to the top of the molded article, on the molded article; separating the cast and the molded article from the mold; drying the molded article; and separating the dried molded article from the cast.

3. Process of making a ceramic article from plastic clay, which comprises simultaneously forming one side of a ceramic article from plastic clay on a thin fluid pervious mold of uniform thickness and forming the other side of the plastic article by pressing and shearing the plastic clay; applying a subatmospheric pressure to the bottom of the fluid pervious mold during the forming of the article to maintain a uniform differential pressure between the top and bottom of the plastic clay as the article is molded; drying the molded article on the fluid pervious mold; and firing the dried molded article on the fluid pervious mold to produce a semi-vitrified ceramic article.

4. Process of molding a ceramic article from plastic clay, which comprises simultaneously forming one side of a ceramic article from plastic clay on a thin flexible fluid pervious surface forming membrane, capable of conforming itself to the contours of a supporting surface and of transmitting a fluid pressure differential uniformly to the surface of the plastic clay as the ceramic article is formed, and forming the other side of the ceramic article by pressing and shearing the plastic clay; applying to the bottom of said membrane during the forming of said article a subatmospheric pressure of substantially uniform value over the entire active surface of said membrane to maintain a substantially uniform fluid pressure differential through the plastic clay as the article is formed; and separating the formed ceramic article from the fluid pervious surface forming membrane.

5. Steps in the process of molding a ceramic article from plastic clay, which comprise simultaneously forming one side of a ceramic article from plastic clay on a thin flexible fluid pervious surface forming membrane, capable of conforming itself to the contours of a supporting surface and of transmitting a fluid pressure differential uniformly to the surface of the plastic clay as the ceramic article is formed, and forming the other side of the ceramic article by pressing and shearing the plastic clay; and applying to the bottom of said membrane during the forming of said article a subatmospheric pressure of substantially uniform value over the entire active surface of said membrane to maintain a substantially uniform fluid pressure differential through the plastic clay as the article is formed.

ROBERT E. GOULD.